US012000676B2

(12) United States Patent
Rogala et al.

(10) Patent No.: US 12,000,676 B2
(45) Date of Patent: *Jun. 4, 2024

(54) OPTICAL SENSOR WITH Tx/Rx APERTURE SHARING ELEMENT (ASE) FOR PROCESSING PASSIVE AND ACTIVE SIGNALS

(71) Applicant: Raytheon Company, Tewksbury, MA (US)

(72) Inventors: Eric Rogala, Tucson, AZ (US); Garret A. Odom, Tucson, AZ (US); Gerald P. Uyeno, Tucson, AZ (US); Sean D. Keller, Tucson, AZ (US); Benn H. Gleason, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 892 days.

This patent is subject to a terminal disclaimer.

(21) Appl. No.: 17/071,729

(22) Filed: Oct. 15, 2020

(65) Prior Publication Data

US 2022/0121035 A1 Apr. 21, 2022

(51) Int. Cl.
*F41G 7/22* (2006.01)
*B60K 31/00* (2006.01)
(Continued)

(52) U.S. Cl.
CPC ........ *F41G 7/2246* (2013.01); *B60K 31/0008* (2013.01); *F41G 7/008* (2013.01);
(Continued)

(58) Field of Classification Search
CPC ............... G02B 27/644; G02B 26/105; B60K 31/0008; F41G 7/2213; F41G 7/2293;
(Continued)

(56) References Cited

U.S. PATENT DOCUMENTS 3,899,145 A 8/1975 Stephenson
6,021,975 A 2/2000 Livingston
(Continued)

FOREIGN PATENT DOCUMENTS

WO WO-2022115164 A2 6/2022
WO WO-2022115164 A3 6/2022

OTHER PUBLICATIONS

"U.S. Appl. No. 17/071,767, Response filed Oct. 7, 2022 to Restriction Requirement dated Sep. 29, 2022", 8 pgs.
(Continued)

*Primary Examiner* — Jennifer D Bennett
*Assistant Examiner* — Erin R Garber
(74) *Attorney, Agent, or Firm* — Schwegman Lundberg & Woessner, P.A.

(57) ABSTRACT

Optical sensors and particularly gimbaled optical sensors transmit an active signal at a given wavelength(s) and receive passive signals over a range of wavelengths and the active signal in a common aperture. The sensor includes a Tx/Rx Aperture Sharing Element (ASE) configured with a center region that couples the active signal to the telescope for transmission and an annular region that couples the passive emissions and the returned active signal to the detector. A filter wheel may be positioned behind the ASE to present separate passive and active images to the detector. These optical sensors may, for example, be used with guided munitions or autonomous vehicles.

24 Claims, 9 Drawing Sheets

(51) Int. Cl.
*F41G 7/00* (2006.01)
*G01S 3/786* (2006.01)
*G01S 7/481* (2006.01)
*G01S 13/931* (2020.01)
*G01S 17/86* (2020.01)
*G02B 27/64* (2006.01)

(52) U.S. Cl.
CPC ......... *F41G 7/2213* (2013.01); *F41G 7/2293* (2013.01); *G01S 3/786* (2013.01); *G01S 7/4812* (2013.01); *G01S 7/4813* (2013.01); *G01S 13/931* (2013.01); *G01S 17/86* (2020.01); *F41G 7/2253* (2013.01); *G02B 27/644* (2013.01)

(58) Field of Classification Search
CPC ...... F41G 7/008; F41G 7/2253; F41G 7/2246; G01S 3/786; G01S 7/4813; G01S 13/931; G01S 7/4812; G01S 17/86; G01S 7/4817
See application file for complete search history.

(56) References Cited

U.S. PATENT DOCUMENTS

| | | | |
|---|---|---|---|
| 6,268,944 | B1 | 7/2001 | Szapiel |
| 6,359,681 | B1 | 3/2002 | Housand et al. |
| 6,792,028 | B2 | 9/2004 | Cook et al. |
| 7,304,296 | B2 | 12/2007 | Mills et al. |
| 7,626,152 | B2 | 12/2009 | King et al. |
| 7,667,190 | B2 | 2/2010 | Mills et al. |
| 8,203,703 | B1 | 6/2012 | Kane et al. |
| 8,380,025 | B2 | 2/2013 | Anderson et al. |
| 9,632,166 | B2 | 4/2017 | Trail et al. |
| 10,267,915 | B2 | 4/2019 | Uyeno et al. |
| 10,444,492 | B2 | 10/2019 | Hopkins et al. |
| 11,181,346 | B1* | 11/2021 | Barfoot ................ F41G 7/2246 |
| 11,686,820 | B2 | 6/2023 | Keller et al. |
| 2003/0062468 | A1 | 4/2003 | Byren et al. |
| 2003/0179444 | A1 | 9/2003 | Cook |
| 2004/0021852 | A1 | 2/2004 | DeFlumere |
| 2005/0024625 | A1* | 2/2005 | Mori ....................... G01S 17/42 356/4.01 |
| 2008/0118247 | A1 | 5/2008 | Drago et al. |
| 2012/0168605 | A1 | 7/2012 | Milanovic |
| 2013/0193315 | A1* | 8/2013 | Shemesh ................... G01J 1/04 359/554 |
| 2014/0253999 | A1* | 9/2014 | Hegg ................ G02B 17/0657 359/432 |
| 2015/0043599 | A1 | 2/2015 | Yanagida et al. |
| 2016/0209510 | A1* | 7/2016 | Sakabe ................... G01S 17/42 |
| 2016/0223327 | A1 | 8/2016 | Norman et al. |
| 2017/0214839 | A1 | 7/2017 | Keller et al. |
| 2017/0343670 | A1* | 11/2017 | Matthews ............... G01S 17/32 |
| 2018/0124342 | A1 | 5/2018 | Uyeno et al. |
| 2019/0066320 | A1 | 2/2019 | Uyeno et al. |
| 2019/0250271 | A1* | 8/2019 | Steffey ..................... G01S 17/86 |
| 2022/0107490 | A1 | 4/2022 | Uyeno et al. |
| 2022/0120861 | A1 | 4/2022 | Keller et al. |
| 2022/0252865 | A1 | 8/2022 | Uyeno et al. |

OTHER PUBLICATIONS

"U.S. Appl. No. 17/071,767, Restriction Requirement dated Sep. 29, 2022", 6 pgs.
"International Application Serial No. PCT/US2021/053725, International Search Report dated Aug. 16, 2022", 4 pgs.
"International Application Serial No. PCT/US2021/053725, Written Opinion dated Aug. 16, 2022", 8 pgs.
Siegman, A. E., "Unstable optical resonatars for laser applications", Proceedings of the IEEE, vol. 53, Issue 3, (Mar. 1965), 277-287.
"U.S. Appl. No. 17/065,177, Non Final Office Action dated Mar. 23, 2023", 9 pgs.
"U.S. Appl. No. 17/065,177, Notice of Allowance dated Aug. 1, 2023", 7 pgs.
"U.S. Appl. No. 17/065,177, Response filed May 31, 2023 to Non Final Office Action dated Mar. 23, 2023", 15 pgs.
"U.S. Appl. No. 17/071,767, Notice of Allowance dated Feb. 15, 2023", 12 pgs.
"U.S. Appl. No. 17/171,577, Notice of Allowance dated Aug. 3, 2023", 9 pgs.
"International Application Serial No. PCT/US2021/053725, International Preliminary Report on Patentability dated Apr. 20, 2023", 10 pgs.
"MEMS Mirror Array—Beam Steering Mode", [Online]. Retrieved from the Internet: <www.youtube.com/watch?v=wHIUU3kKtzM>, (Aug. 10, 2017), 2 pgs.
Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.
Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.
Tsou, et al., "Extended-image spatial tracking technique for deep-space optical downlinks", Proc. SPIE 3762, Adaptive Optics Systems and Technology, (Sep. 27, 1999), 101-109.
Tuantranont, et al., "Optical beam steering using MEMS-controllable microlens array", Sensors and Actuators A: Physical vol. 91, Issue 3, (Jul. 15, 2001), 363-372.

* cited by examiner

OPTICAL SENSOR WITH Tx/Rx APERTURE SHARING ELEMENT (ASE) FOR PROCESSING PASSIVE AND ACTIVE SIGNALS

BACKGROUND OF THE INVENTION

Field of the Invention

This invention relates to optical sensors and particularly to gimbaled optical sensors that transmit an active signal at a given wavelength and receive passive signals over a range of wavelengths and the active signal return.

Description of the Related Art

Gimbaled optical sensors are commonly used as part of guided munitions and possibly autonomous vehicles. Passive systems use light emissions e.g. IR or visible from a target to detect and track the target. Active systems use an on-board source to emit light e.g. IR or visible, or RF that is reflected from the target to detect and track the target. The active return may be used for ranging, simple guidance commands to a target centroid or active imaging. The on-board source may also be used for other applications. The passive and active systems are often combined.

A typical gimbaled optical sensor includes inner (nod) and outer (roll) gimbals positioned behind a protective dome or window that rotate about orthogonal axes such that the optical axis is pointed into a three-dimensional space. An off-gimbal detector is responsive to a band of wavelengths e.g. Visible or IR (SWIR, MWIR, NIR, LWIR, etc.) A telescope mounted on the inner gimbal along the optical axis collects light from the target to form an intermediate image. Gimbal optics propagate the light over the inner (nod) and outer (roll) gimbals along an optical path while preserving image quality. Off-gimbal focus optics relay the intermediate image to the detector. In some applications, an Aperture Sharing Element (ASE) is positioned in a receive aperture to separate the incident light into different wavelength bands e.g. Visible and IR and direct the light to different detectors. In a passive system, the pointer detects only emissions from the target within the field-of-view (FOV) of the telescope. In a passive system, pointing control of a transmitter is performed "open loop", based only on the detection of the passive emissions of the target.

To add active capabilities, an off-gimbal optical source e.g., a laser, emits light in a narrowband around a specified wavelength. This transmit signal is routed along an optical path (free-space or fiber) along the gimbal axes to a transmit telescope where it is transmitted toward the target. The transmit telescope may be mounted off-axis from the receive telescope or a common Tx/Rx telescope may be used for both transmit (Tx) and receive (Rx). In the later case, an ASE may be positioned in a common aperture to couple the transmit signal from the optical source to the common Tx/Rx telescope and to couple the returned transmit signal and the passive emissions from the target to the detector. An additional ASE may be positioned in the receive path to separate the incident light into different wavelength bands and direct the light to different detectors. Processing of the active signal return again may provide for ranging, centroid guidance or active imaging. This allows for pointing control of a transmitter to be performed "closed loop" based on the desired and actual location of the laser spot on the target.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides optical sensors and particularly gimbaled optical sensors that transmit an active signal at a given wavelength(s) and receive passive signals over a range of wavelengths and the active signal return. The sensor includes a Tx/Rx Aperture Sharing Element (ASE) configured with a center region (reflective or transmissive) that couples the optical transmit signal to the telescope for transmission and an annular region (transmissive or reflective) that couples the passive emissions and the returned transmit signal to the detector. The transmit and receive signals may be co-boresighted or the transmit signal may be offset from boresight. A filter wheel may be positioned behind the ASE to present separate passive and active images to the detector. These optical sensors may, for example, be used with guided munitions or autonomous vehicles.

In an embodiment, a common Tx/Rx telescope is mounted on a pair of inner and outer gimbals that point an optical axis. An off-gimbal optical source emits an optical transmit signal at a first transmission wavelength at a fixed off-gimbal access point. A free-space optical path along the first and second gimbal axes couples light from the common Tx/Rx telescope to an off-gimbal detector. An off-gimbal aperture sharing element (ASE) is positioned in a common Tx/Rx aperture in the free-space optical path. A center region (reflective or transmissive) of the ASE free-space couples the optical transmit signal from the off-gimbal access point into the free-space optical path and to the common Tx/Rx telescope for transmission towards a scene. An annular region (transmissive or reflective) of the ASE couples the returned transmit signal and passive emissions from the scene received by the common Tx/Rx telescope to the off-gimbal detector to image the scene.

In different embodiments, the ASE includes an optically transparent plate. A reflective dot is positioned to form a reflective center region and a transmissive annular region around the dot. The reflective center region may be positioned at the center of or offset from the center of the plate. Alternately, the ASE includes an optically reflective plate. A through hole forms a transmissive center region and a reflective annular region around the through hole. The through hole may be positioned at the center of or offset from the center of the plate.

In an embodiment, the free-space optical path includes focusing optics that relay an intermediate image from the telescope to the off-gimbal detector. The ASE is positioned within the focusing optics suitably within a relay section of the optics where any structure or optical imperfections of the ASE are not imaged at the detector.

In an embodiment, one or more optical sources emit light at a plurality of transmission wavelengths that are coupled via the ASE into the free-space optical path.

In an embodiment, control circuitry processes the passive returns from the detector to generate a guidance command to control the inner and outer gimbals to point the optical axis in an "open-loop" configuration. The control circuitry may process the returns to detect a target and then activate the off-gimbal optical source to engage the target.

In another embodiment, the optical sensor is configured with an ASE that couples the optical transmit signal to the telescope and directs the returned transmit signal and other passive emissions to a detector. The entire assembly including the optical sources and detector may be fixed or may be mounted on one or more gimbals or other mechanisms to point the optical axis.

In an embodiment, a filter wheel is positioned between the ASE and the detector. The filter wheel includes at least a first filter segment configured to pass the returned optical transmit signal at the first transmission wavelength and a second filter segment configured to block the returned optical transmit signal and pass the passive emissions from at least some of the plurality of other wavelengths such that the detector alternately produces active and passive images of the scene. The second filter segment may include multiple sub-segments that pass different bands of passive emissions. The second filter segment may also include a sub-segment that reflects all emissions to facilitate Non-Uniform Correction (NUC). A third segment may be used to pass all of the wavelengths.

In an embodiment, control circuitry coupled to the detector is configured to process passive images of the scene to detect a target, activate the optical source to emit the optical transmit target to illuminate the target, process an active image of the target to provide close-loop feedback to point the optical axis at the target, and process passive images of the target.

These and other features and advantages of the invention will be apparent to those skilled in the art from the following detailed description of preferred embodiments, taken together with the accompanying drawings, in which:

DETAILED DESCRIPTION OF THE INVENTION

The present invention provides optical sensors and particularly gimbaled optical sensors that transmit an active signal and receive the active signal return and passive signals in a common aperture configuration. The sensor includes an Aperture Sharing Element (ASE) in which a center region (reflective or transmissive) is configured to re-direct the optical transmit signal provided by an optical source for transmission along an optical axis. The active signal returns and the passive emissions from the scene are received along, or offset from, the optical axis and directed via an annular region (transmissive or reflective) of the ASE to the detector.

Figure 1A:
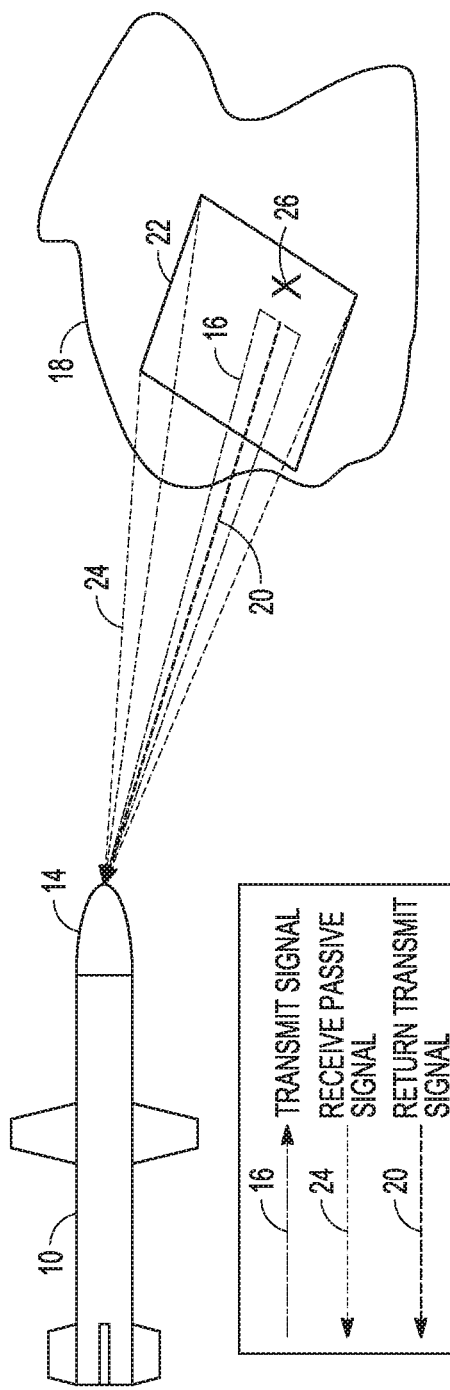
FIGS. 1A and 1B are illustrations of an optical sensor mounted on a guided munition and an autonomous vehicle, respectively, in which in accordance with the present invention an off-gimbal ASE is positioned in a common Tx/Rx aperture to process transmit and receive signals.
Figure 1B:
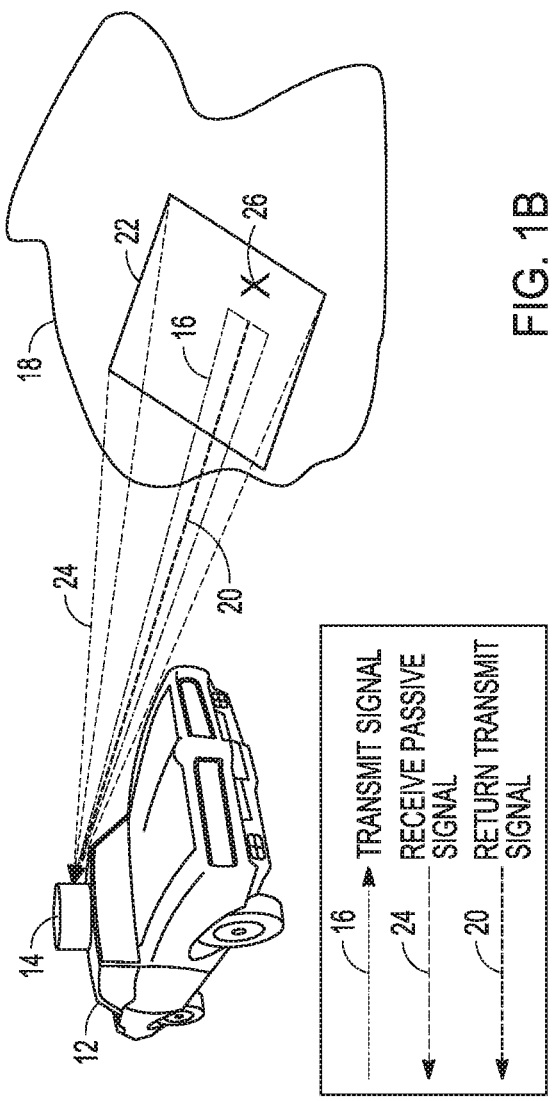

Referring now to FIGS. 1A and 1B, a guided munition 10 such as a missile, rocket, projectile etc. and an autonomous vehicle 12 such as a car, truck, drone, etc., which could be manned or unmanned, are provided with a gimbaled optical sensor 14. The gimbaled optical sensor directs an optical transmit signal 16 (the "active signal") towards a scene 18, which reflects the light to generate a returned transmit signal 20 that is collected by the sensor's telescope. Within the sensor's field-of-view (FOV) 22 passive emissions 24 are also collected by the sensor's telescope. The optical transmit signal, and thus the returns, may be in the same or different band as the passive emissions. For example, the passive emissions may span a portion of the NIR band and the optical transmit signal could occupy a very narrow band (few nm) around a specific wavelength(s) in the NIR band. Alternately, the passive emissions may span a portion of the NIR band and the optical transmit signal could occupy a narrow band around a specific wavelengths(s) in the Visible band. Other combinations of in and out of band active and passive emissions will exist. Both the passive emissions 24 and the returned transmit signal 20 are collected by the sensor's telescope. The sensor is configured to pass the returned transmit signal 20 and the passive emissions 24 to a detector.

Figure 2:
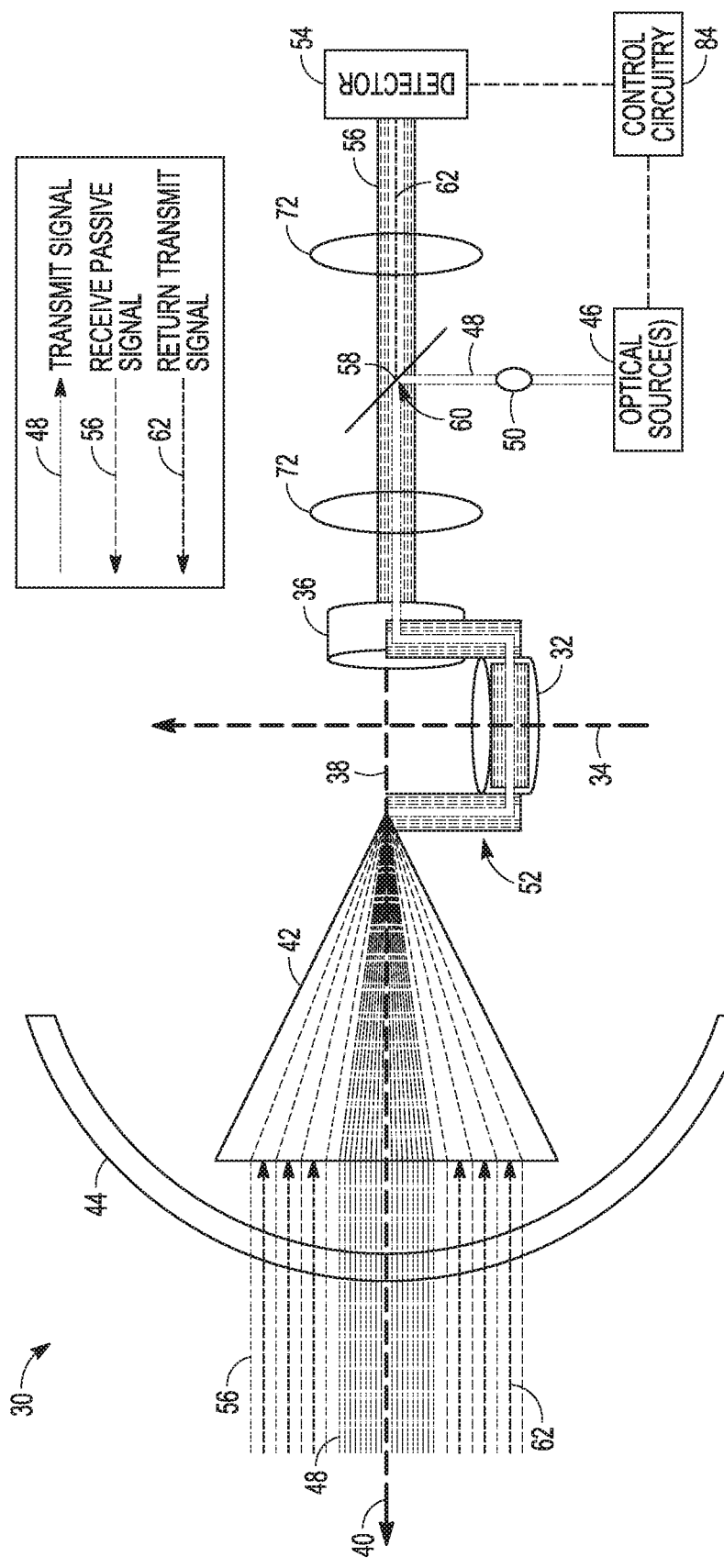
FIG. 2 is a simplified schematic diagram of an embodiment of a gimbaled optical sensor in which an off-gimbal is ASE positioned in a common Tx/Rx aperture.
Figure 3:
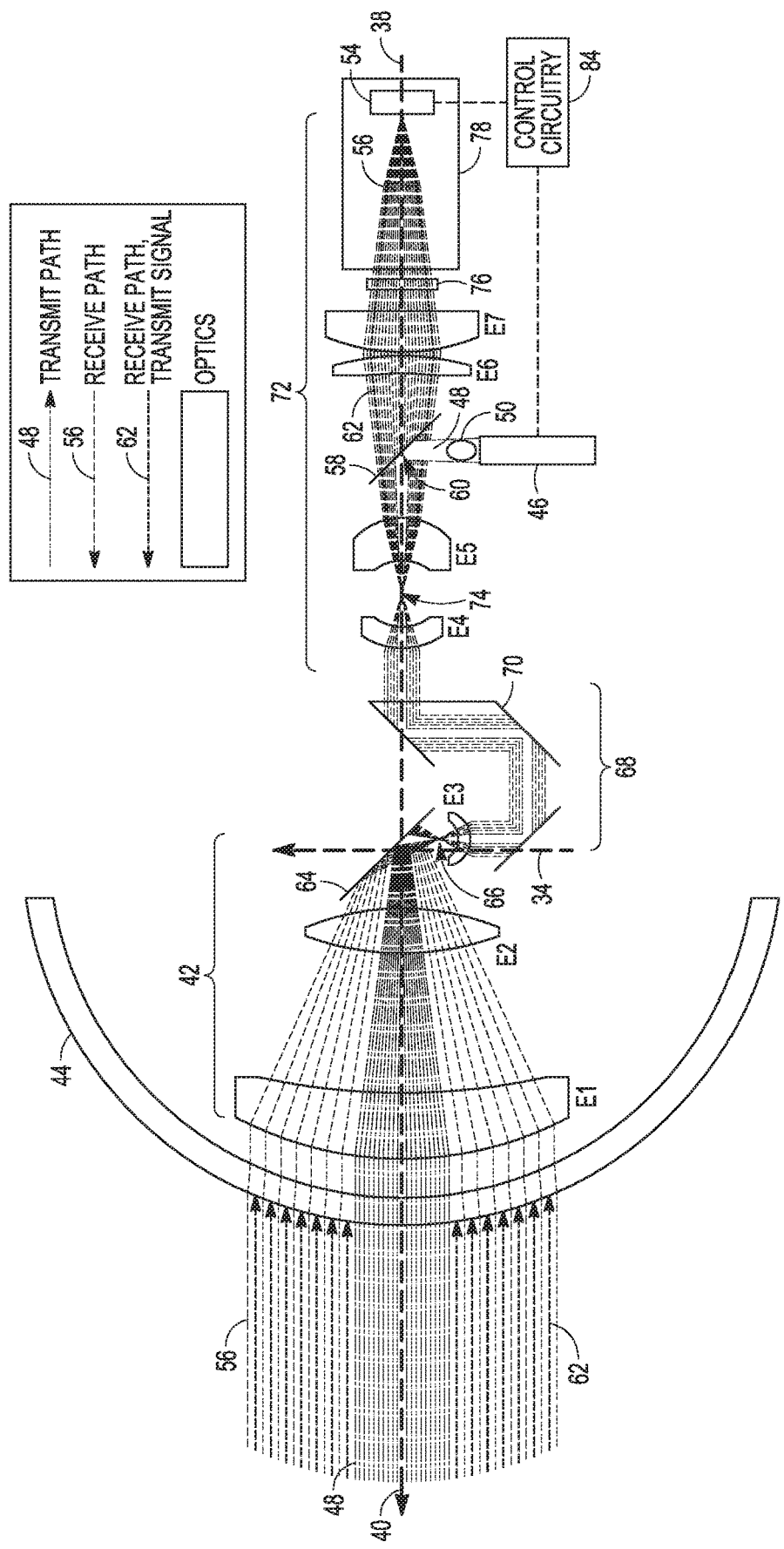
FIG. 3 is a schematic diagram of an embodiment of a gimbaled optical sensor in which an off-gimbal ASE is positioned in a common Tx/Rx aperture.

Referring now to FIGS. 2 and 3, an embodiment of a gimbaled optical sensor 30 includes an outer (roll) gimbal 32 that rotates around a first gimbal axis 34 and an inner (nod) gimbal 36 that rotates around a second gimbal axis 38 orthogonal to the first gimbal axis to point an optical axis 40 in a multi-dimensional space defined by the first and second gimbal axes. A common Tx/Rx telescope 42 is mounted on the inner gimbal along the optical axis behind a protective optically transparent dome 44. An off-gimbal optical source(s) 46 emits an optical transmit signal 48 at a first transmission wavelength, perhaps multiple wavelengths, at a fixed off-gimbal access point 50. A free-space optical path 52 routed along the first and second gimbal axes couples light 56 from the common Tx/Rx telescope 42 to an off-gimbal detector 54. The transmitted optical transmit signal 48 and received light 56 are co-boresighted along the optical axis 40. In other embodiments, the optical transmit signal 48 may be offset from boresight.

An off-gimbal aperture sharing element (ASE) 58 is positioned in a common Tx/Rx aperture 60 in the free-space optical path 52. A center region of ASE 58 free-space couples the optical transmit signal 48 from the off-gimbal access point 50 into the free-space optical path 53 and to the common Tx/Rx telescope for transmission towards a scene. An annular region of ASE 58 couples passive emissions 56 from the scene and a returned transmit signal 62 (reflections of optical transmit signal 48 off the scene) received by the common Tx/Rx telescope, to the off-gimbal detector 54 to image the scene at a plurality of wavelengths.

As more particularly shown in FIG. 3, the optical system of the sensor for a particular embodiment is shown and will be described in additional detail. Many different configurations of the optical system fall within the scope of the invention in which an off-gimbal ASE directs the optical transmit signal from a fixed off-gimbal access point to the telescope and passes the returned optical transmit signal and passive emissions from the scene to an off-gimbal detector in which transmit and receive are co-boresighted.

In this embodiment, optically transparent protective dome 44 has essentially no power. The dome receives collimated light from the scene and outputs collimated, perhaps slightly divergent, light. The dome's function is to maintain a boundary between the environment and the optics. Telescope 42 includes three lens elements E1 and E2 and a turning mirror 64 that focus the collimated light from the scene e.g. optical transmit signal returns or passive emissions, and focus an image of the scene onto a field stop (aperture) 66 that limits the sensor FOV.

Free-space optical path 52 includes gimbal (roll & nod) optics 68 that couple light across the gimbal axes to allow the system to rotate about the axes without impacting image quality. The gimbal optics 68 includes lens element E3 and a prism 70 that recollimate the light at the output face of the prism.

Free-space optical path 52 also includes focus optics 72 that relay the intermediate image of the scene initially formed at field stop 66 to the detector over a sufficient distance to accommodate other optomechanical structures and motors. Focus optics 72 include lens element E4 that focuses the collimated light at the output face of the prism to reimage the intermediate image at a field stop 74. Focus optics 72 includes lens elements E5-E7 that serve to relay the intermediate image from field stop 74 to the detector. Additional elements include a filter 76 that selects and passes specific optical bands of the returned transit signal and passive emissions through to the detector. For example, filter 76 may include a filter wheel that alternately passes the returned transmit signal and only the passive emissions. The passive portion of the filter wheel may itself serially pass a broadband, a narrowband and performs Non-Uniform Compensation (NUC) on the detector. Many other filter configurations are within the scope of the invention. The detector 54 is part of an integrated Dewar assembly (IDA) 78 that provides a cold volume for detection.

ASE 58 is positioned off gimbal within focus optics 72. The ASE is suitably positioned at a position away from a field stop/image plane at which any structure or optical imperfections of the ASE are not imaged onto the detector. In particular, the structure that forms the "center region" of the ASE should not be imaged onto the detector. As shown the ASE is positioned within the optical lens elements E4-E7 that relay the intermediate image at a place where the beam is wide and diverging.

The optical system achieves a near diffraction limited output e.g., almost perfect optical performance, devoid of aberrations. Critical to this is the use of the common ASE to free-space couple the optical transmit signal from the fixed access point 50 off-gimbal into the free-space optical path.

Control circuitry 84 processes the returns from the detector to generate a guidance command to control the inner and outer gimbals to point the optic axis and to process active or passive images. In an embodiment, control circuitry is configured to process passive images of the scene to detect a target, activate the optical source to emit the optical transmit target to illuminate the target, process an active image of the target to provide close-loop feedback to point the optical axis at the target, and process passive images of the target.

Figure 4A:
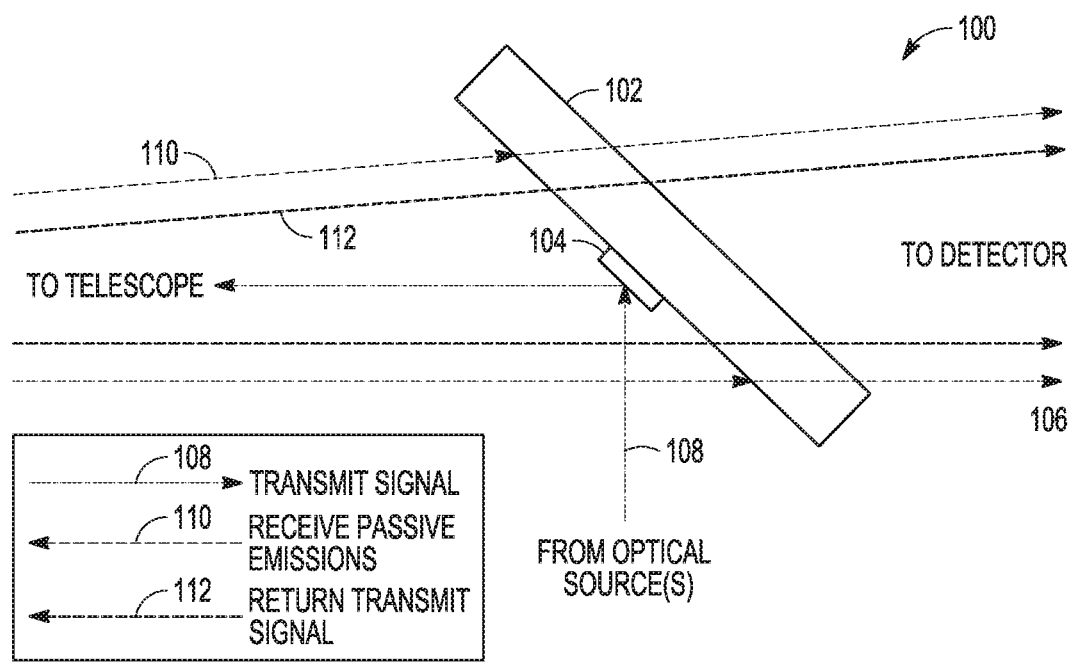
FIGS. 4A and 4B are a ray tracing diagram and an illustration of an embodiment of an ASE.
Figure 4B:
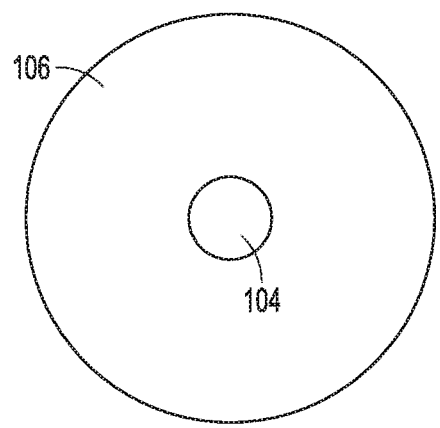

Referring now to FIGS. 4A and 4B, an embodiment of an ASE 100 includes an optically transparent plate 102 that is transmissive at the first transmission wavelength and at least wavelengths of interest for passive emissions from the scene. A dot 104 formed of a reflective material (reflective to at least a narrowband around the first transmission wavelength) is positioned on a forward (or rear) surface of plate 102 at the center of the plate such that the transmitted and received signals are co-boresighted. The dot could be offset from boresight and the offset compensated for during calibration. Dot 104 provides a reflective center region within a transmissive annular region 106.

ASE 100 is positioned to reflect via dot 104 an optical transmit signal 108 from the off-gimbal optical source at the first transmission wavelength into the free-space optical path and to the telescope. The ASE 102 transmits light including passive emissions 110 and a returned optical transmit signal 112 received by the common Tx/Rx telescope through annular region 106 of the optically transparent plate 102 toward the off-gimbal detector.

Figure 5A:
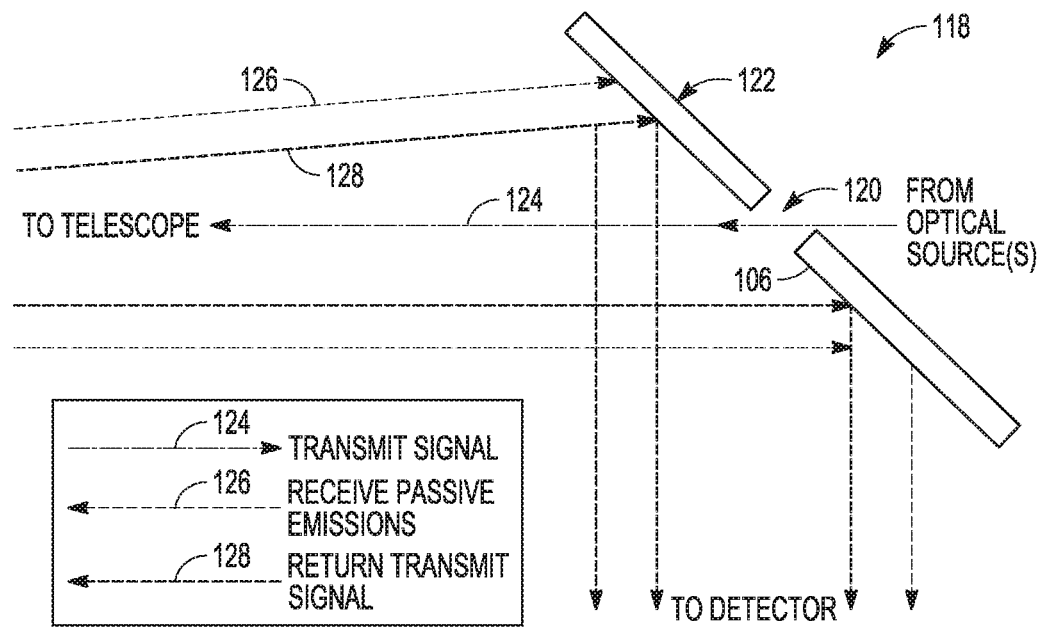
FIGS. 5A and 5B are a ray tracing diagram and an illustration of another embodiment of an ASE.
Figure 5B:
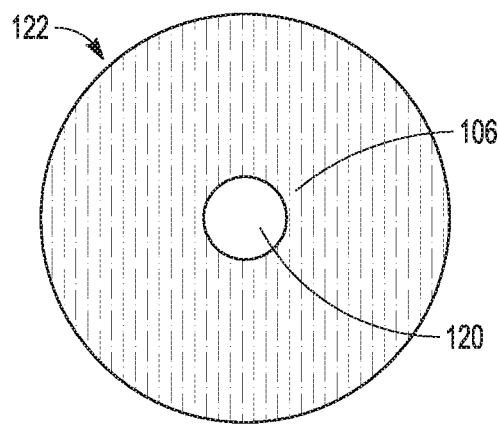

In an alternate embodiment shown in FIGS. 5A and 5B, in an ASE 118 a through hole 120 is formed at the center, or offset from the center, of an optically reflective plate 122. An optical transmit signal 124 is directed to pass through the through hole 120 into the free-space optical path to the telescope. The passive emissions 126 and a returned optical transmit signal 128 are reflected off the annular region of the plate towards the detector. The optical system of FIGS. 2 and 3 would have to be reconfigured to use ASE 118 with the optical sources positioned to transmit light through the through hole 120 and the focus optics and detector positioned to receive the reflected light.

In both embodiments, the "center region" and the optical transmit signal should be sized such that substantially all, and preferably all, of the optical transmit signal is directed into the free-space optical path. In either case, failure to do so would result in a reduction in transmit power. In the 'dot' embodiment, if the optical transmit signal is too big for or misaligned with the dot, the high-power signal could be transmitted internal to the system, which is undesirable unless effectively mitigated e.g., dump, baffle, etc. At the same time, the "center region" should be a relatively small percentage of the aperture in order that nearly all of the passive emissions and returned optical transmit signal may be passed to the detector. In different embodiments, the dot should occupy no more than 20% of the aperture and preferably less than 10%.

Figure 6:
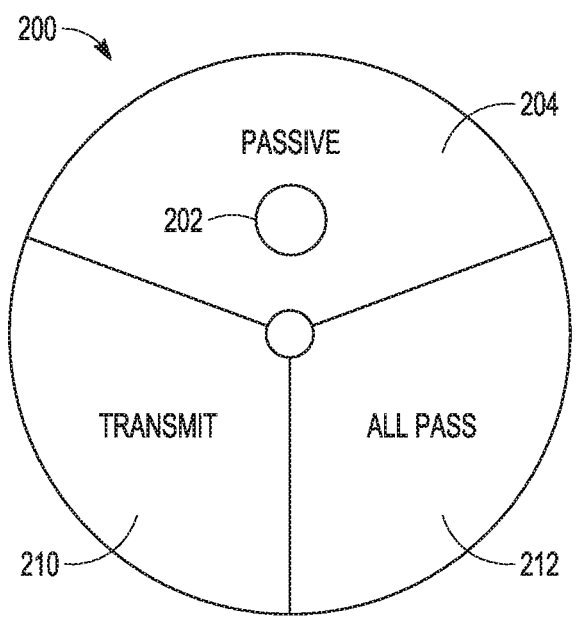
FIGS. 6 and 7A-7B are an illustration of an embodiment of a filter wheel and the filter response for the passive and transmit segments of the filter wheel.
Figure 7A:
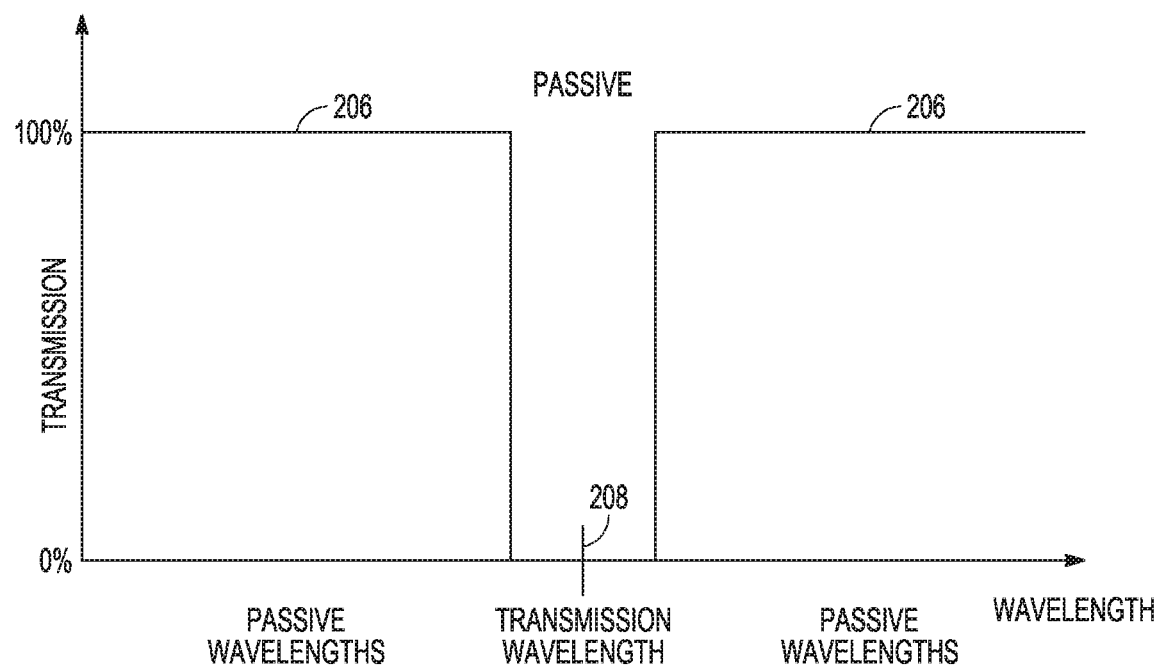
Figure 7B:
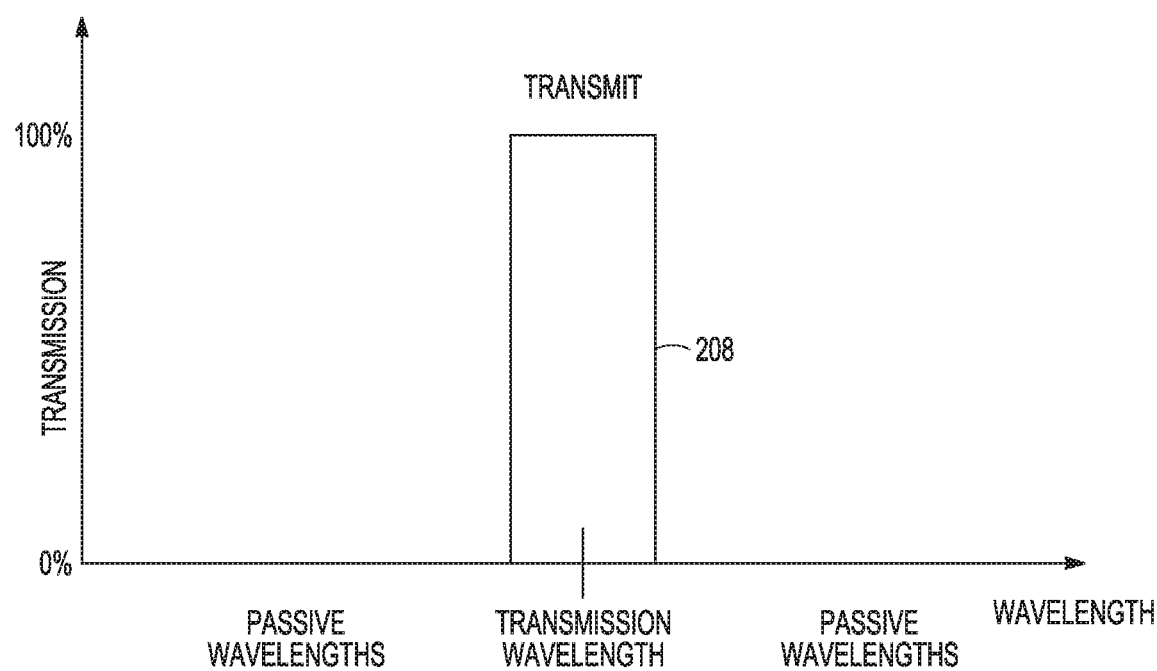
Figure 8:
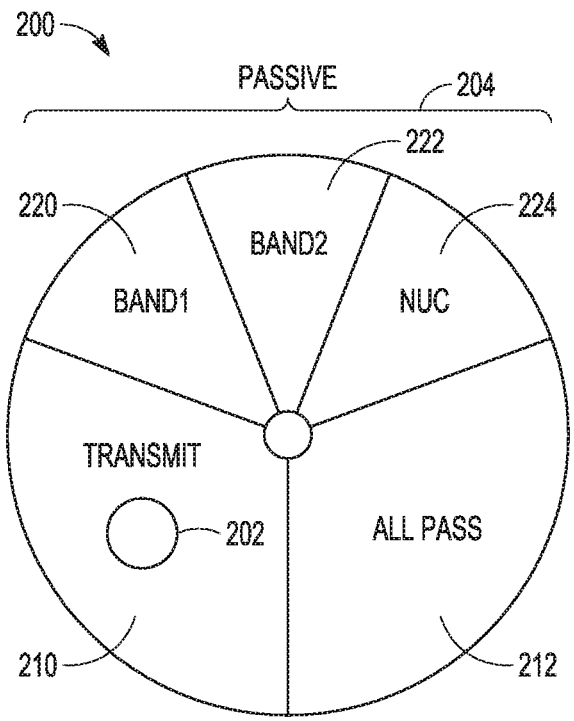
FIGS. 8 and 9A-9C are an illustration of an embodiment of a filter wheel and the filter response different sub-segments of the passive segment.
Figure 9A:
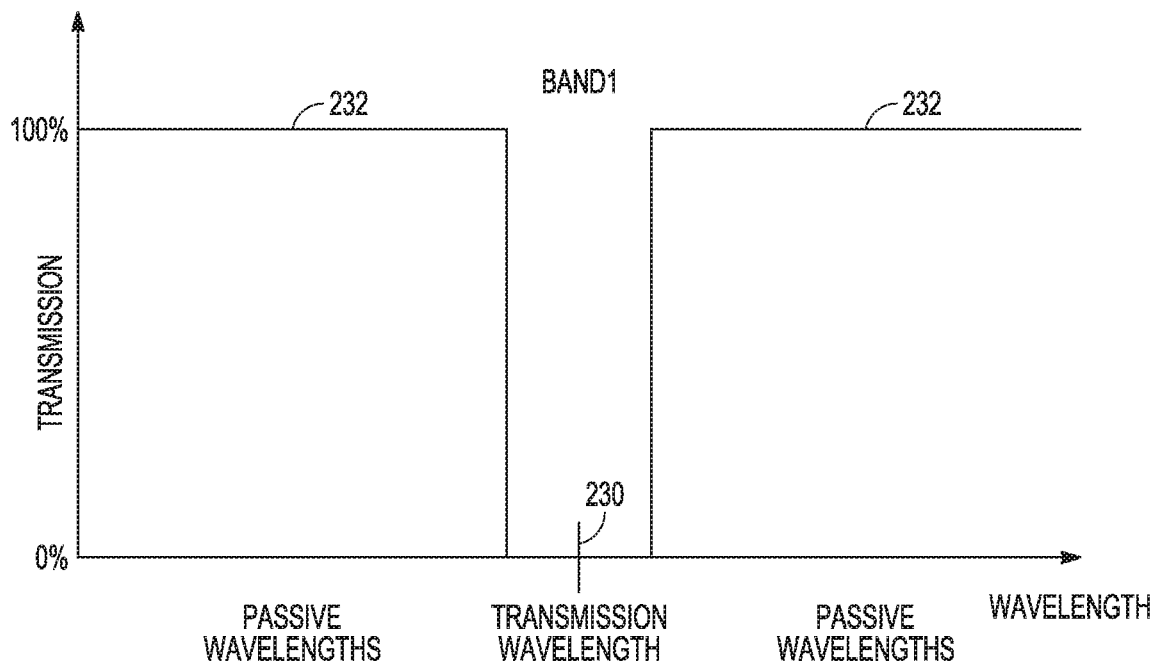
Figure 9B:
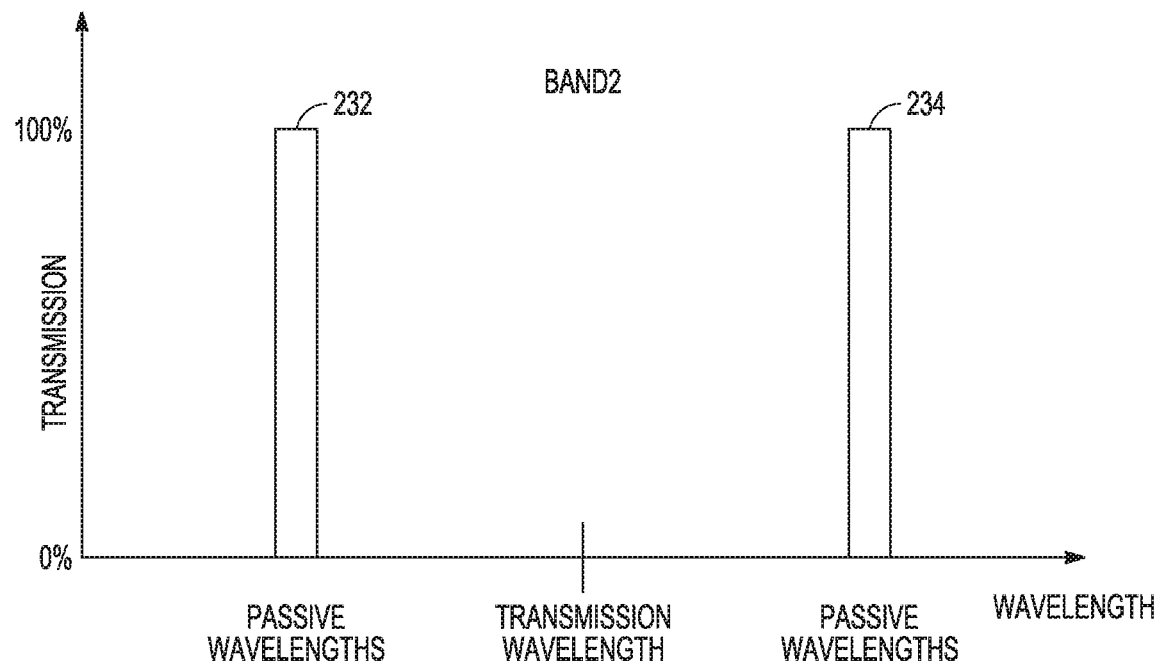
Figure 9C:
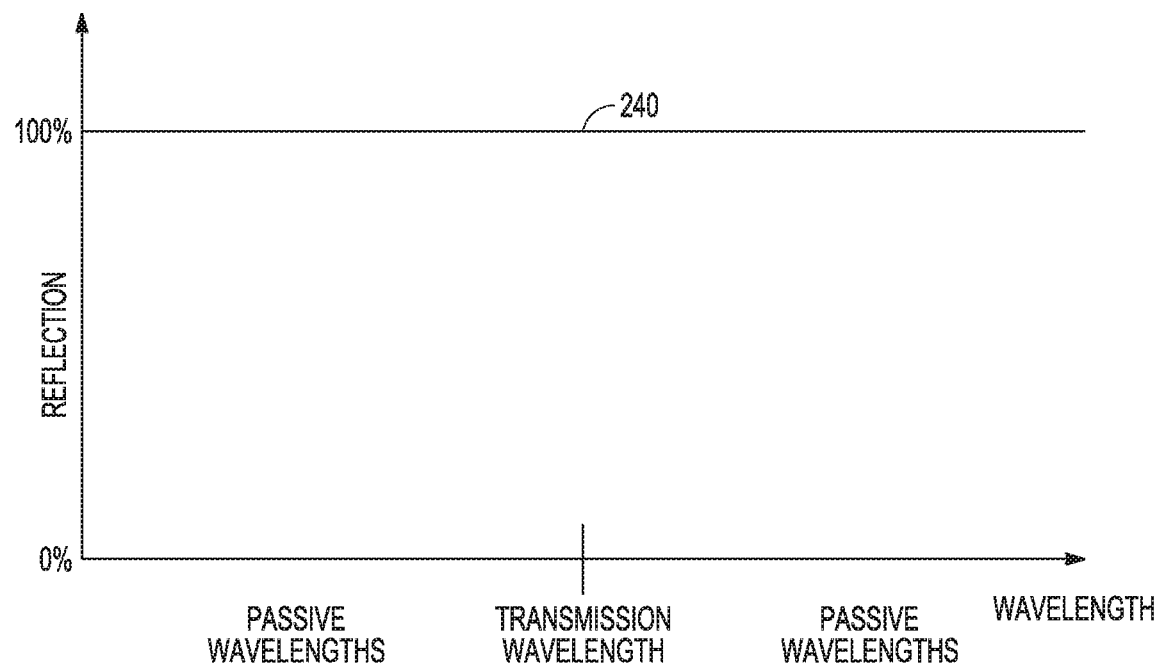

Referring now to FIGS. 6 and 7A-7B, in an embodiment a rotating filter wheel 200 is positioned between the ASE and the gimbal so that a beam 202 of received light (returned optical transmit signal and passive scene emissions) is time-sequentially filtered by a plurality of filter segments. In this embodiment, filter wheel 200 includes a passive segment 204 that passes all wavelengths 206 except a narrowband 208 centered about the first transmission wavelength, a transmit segment 210 that passes only the narrowband 208 centered about the first transmission wavelength and an all pass segment 212 that passes all wavelengths. The percentage of a rotation period each segment occupies is arbitrary and based on the requirements of a specific application or mission. A different embodiment may include only the passive and transmit segments. The control circuitry may be configured to process passive images of the scene to detect a target (passive segment), to activate the optical source to emit the optical transmit target to illuminate the target, to process an active image of the target to provide close-loop feedback to point the optical sensor at the target (active segment), and to process passive images of the target (passive segment).

Referring now to FIGS. 8 and 9A-9C, in an embodiment passive segment 204 is divided into Band1, Band2 and NUC (Non-Uniform Correction) segments 220, 222, and 224, respectively. Band1 220 rejects the narrowband 230 around the transmission wavelength and passes the remaining wavelengths 232. Band2 222 passes two narrowbands 234 and 236 corresponding to two particular wavelengths of interest.

NUC 224 reflects all wavelengths 240 to enable Non-Uniform Correction of the detector. When no light from the scene passes through the detector, the only detected emissions are from the "flat" field of the NUC segment, which enables the detector to correct for the non-uniformities of certain optical elements behind the filter wheel and noise on the detector. Again, the relative sizes of the segments are arbitrary and dependent on the application or mission.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor, comprising:
    an outer gimbal that rotates around a first gimbal axis;
    an inner gimbal that rotates around a second gimbal axis orthogonal to the first gimbal axis to point an optical axis in a multi-dimensional space defined by said first and second gimbal axes;
    a common Tx/Rx telescope mounted on the inner gimbal along the optical axis;
    an off-gimbal optical source that emits an optical transmit signal at a first transmission wavelength at a fixed off-gimbal access point;
    an off-gimbal detector responsive to light at a plurality of wavelengths;
    a free-space optical path along the first and second gimbal axes to couple light from the common Tx/Rx telescope to the off-gimbal detector; and
    an off-gimbal aperture sharing element (ASE) positioned in a common Tx/Rx aperture at a fixed angle to the free-space optical path, said off-gimbal ASE comprising a center region and an annular region, one of said center and annular regions configured to be optically transparent at the first transmission wavelength and the other to be optically reflective at the first transmission wavelength,
    wherein the optical transmit signal is directed from the fixed off-gimbal axis point onto the center region of the off-gimbal ASE to free-space couple the optical transmit signal at the first transmission wavelength into the free-space optical path and to the common Tx/Rx telescope for transmission towards a scene,
    wherein light including the first transmission wavelength and a plurality of other wavelengths returned from the scene and received by the common Tx/Rx telescope is directed onto the annular region of the off-gimbal ASE to free-space couple the light to the off-gimbal detector to image the scene.

2. The optical sensor of claim 1, wherein the off-gimbal ASE comprises:
    a plate that is optically transparent to the first transmission wavelength and a plurality of other wavelengths for passive emissions from the scene; and
    a reflective dot on a surface of the plate, said reflective dot being optically reflective to the first transmission wavelength to form the center region, a portion of the optically transparent plate around the reflective dot forming the annular region,
    wherein said off-gimbal optical source directs the optical transmit signal onto the center region, which reflects the optical transmit signal into the free-space optical path;
    wherein light returned from the scene passes through the annular region to the off-gimbal detector.

3. The optical sensor of claim 1, wherein the off-gimbal ASE comprises:
    a plate that is optically reflective to the first transmission wavelength and a plurality of other wavelengths for passive emissions from the scene; and
    a through hole in the plate to form the center region, a portion of the optically reflective plate around the through hole forming the annular region,
    wherein said off-gimbal optical source directs the optical transmit signal through the center region into the free-space optical path;
    wherein light returned from the scene reflects off the annular region to the off-gimbal detector.

4. The optical sensor of claim 1, wherein one or more off-gimbal optical sources emit light at a plurality of transmission wavelengths, wherein the center region of the off-gimbal ASE couples the light at the plurality of transmission wavelengths to the common Tx/Rx telescope and the annular region of the off-gimbal ASE couples light received by the common Tx/Rx telescope to the off-gimbal detector to image the scene.

5. The optical sensor of claim 1, further comprising a guided munition on which the optical sensor is mounted.

6. The optical sensor of claim 1, further comprising an autonomous vehicle on which the optical sensor is mounted.

7. The optical sensor of claim 1, further comprising:
    a filter wheel positioned between the off-gimbal ASE and the off-gimbal detector, said filter wheel including at least a first filter segment configured to pass a returned optical transmit signal at the first transmission wavelength and a second filter segment configured to block the returned optical transmit signal and pass passive emissions from at least some of the plurality of other wavelengths,
    wherein said off-gimbal detector alternately produces active and passive images of the scene.

8. The optical sensor of claim 7, further comprising:
    control circuitry coupled to the off-gimbal detector, said control circuitry configured to process the passive images of the scene to detect a target, to activate the off-gimbal optical source to emit the optical transmit signal to illuminate the target, to process the active image of the target to provide close-loop feedback to point the optical sensor at the target, and to process passive images of the target.

9. The optical sensor of claim 7, wherein said filter wheel includes a third filter segment configured to pass the returned optical transmit signal and the other passive wavelengths.

10. The optical sensor of claim 1, wherein the transmitted optical transmit signal and the received light from the scene are co-boresighted along the optical axis.

11. An optical sensor, comprising:
    an outer gimbal that rotates around a first gimbal axis;
    an inner gimbal that rotates around a second gimbal axis orthogonal to the first gimbal axis to point an optical axis in a multi-dimensional space defined by said first and second gimbal axes;
    a common Tx/Rx telescope mounted on the inner gimbal along the optical axis;
    an off-gimbal optical source that emits an optical transmit signal at a first transmission wavelength at a fixed off-gimbal access point;
    an off-gimbal detector responsive to light at a plurality of wavelengths;

a free-space optical path along the first and second gimbal axes to couple light from the common Tx/Rx telescope to the off-gimbal detector; and an off-gimbal aperture sharing element (ASE) positioned in a common Tx/Rx aperture in the free-space optical path, said ASE comprising a center region and an annular region, wherein the optical transmit signal is directed from the fixed off-gimbal axis point onto the center region of the ASE to free-space couple the optical transmit signal into the free-space optical path and to the common Tx/Rx telescope for transmission towards a scene, wherein light returned from the scene and received by the common Tx/Rx telescope is directed onto the annular region of the ASE to free-space couple the light to the off-gimbal detector to image the scene;

wherein said common Tx/Rx telescope produces an intermediate image at a first field stop from received light, said free-space optical path including gimbal optics that couple light across the first and second gimbal axes and off-gimbal focusing optics that relay the intermediate image of the scene to the off-gimbal detector, wherein the off-gimbal ASE is positioned off-gimbal within the off-gimbal focusing optics.

12. The optical sensor of claim 11, wherein the off-gimbal focusing optics include one or more optical elements to re-image the intermediate image from the common Tx/Rx telescope at a second field stop and a plurality of optical elements that relay the intermediate image from the second field stop to the off-gimbal detector, wherein the off-gimbal ASE is positioned within the plurality of optical elements that relay the intermediate image at a position at which any structure or optical imperfections of the off-gimbal ASE are not imaged at the detector.

13. An optical sensor, comprising:
an outer gimbal that rotates around a first gimbal axis;
an inner gimbal that rotates around a second gimbal axis orthogonal to the first gimbal axis to point an optical axis in a multi-dimensional space defined by said first and second gimbal axes;
a common Tx/Rx telescope mounted on the inner gimbal along the optical axis;
an off-gimbal optical source that emits an optical transmit signal at a first transmission wavelength at a fixed off-gimbal access point;
an off-gimbal detector responsive to light at a plurality of wavelengths;
a free-space optical path along the first and second gimbal axes to couple light from the common Tx/Rx telescope to the off-gimbal detector;
an off-gimbal aperture sharing element (ASE) positioned in a common Tx/Rx aperture in the free-space optical path, said off-gimbal ASE comprising a center region and an annular region,
wherein the optical transmit signal is directed from the fixed off-gimbal axis point onto the center region of the off-gimbal ASE to free-space couple the optical transmit signal into the free-space optical path to the common Tx/Rx telescope for transmission towards a scene,
wherein light returned from the scene including a returned optical transmit signal at the first transmission wavelength and passive emissions at a plurality of other wavelengths and received by the common Tx/Rx telescope is directed onto the annular region of the off-gimbal ASE to free-space couple the light towards the off-gimbal detector to image the scene; and a filter wheel positioned between the off-gimbal ASE and the off-gimbal detector, said filter wheel including at least a first filter segment configured to pass the returned optical transmit signal at the first transmission wavelength and a second filter segment configured to block the returned optical transmit signal and pass the passive emissions from at least some of the plurality of other wavelengths;

wherein said off-gimbal detector alternately produces active and passive images of the scene.

14. The optical sensor of claim 13, wherein the plurality of wavelengths of the passive emissions span a band, wherein the first transmission wavelength lies within the band.

15. The optical sensor of claim 13, wherein the plurality of wavelengths of the passive emissions span a band, wherein the first transmission wavelength lies outside the band.

16. The optical sensor of claim 13, further comprising:
control circuitry coupled to the off-gimbal detector, said control circuitry configured to process the passive images of the scene to detect a target, to activate the off-gimbal optical source to emit the optical transmit signal to illuminate the target, to process the active image of the target to provide close-loop feedback to point the optical axis at the target, and to process passive images of the target.

17. The optical sensor of claim 13, wherein said filter wheel includes a third filter segment configured to pass the returned optical transmit signal and the other wavelengths of passive emission.

18. The optical sensor of claim 13, wherein said common Tx/Rx telescope produces an intermediate image at a first field stop from received light, said free-space optical path including gimbal optics that couple light across the first and second gimbal axes and off-gimbal focusing optics that relay the intermediate image of the scene to the off-gimbal detector, wherein the ASE is positioned off-gimbal in the off-gimbal focusing optics.

19. An optical sensor, comprising:
a common Tx/Rx telescope mounted along an optical axis;
an optical source that emits an optical transmit signal at a first transmission wavelength;
a detector responsive to light at a plurality of wavelengths;
a free-space optical path to couple light from the common Tx/Rx telescope to the detector; and
an aperture sharing element (ASE) positioned in a common Tx/Rx aperture at a fixed angle to the free-space optical path, said ASE comprising a center region and an annular region one of said center and annular regions configured to be optically transparent at the first transmission wavelength and the other to optically reflective at the first transmission wavelength;
wherein the optical transmit signal is directed onto the center region of the ASE to free-space couple the optical transmit signal at the first transmission wavelength into the free-space optical path to the common Tx/Rx telescope for transmission towards a scene;
wherein light including the first transmission wavelength and a plurality of other wavelengths returned from the scene and received by the common Tx/Rx telescope is directed onto the annular region of the ASE to free-space couple the light to the detector to image the scene.

20. An optical sensor, comprising:
a common Tx/Rx telescope mounted along an optical axis;
an optical source that emits an optical transmit signal at a first transmission wavelength;
a detector responsive to light at a plurality of wavelengths;
a free-space optical path to couple light from the common Tx/Rx telescope to the detector;
an aperture sharing element (ASE) positioned in a common Tx/Rx aperture in the free-space optical path, said ASE comprising a center region and an annular region;
wherein the optical transmit signal is directed onto the center region of the ASE to free-space couple the optical transmit signal into the free-space optical path to the common Tx/Rx telescope for transmission towards a scene;
wherein light returned from the scene and received by the common Tx/Rx telescope is directed onto the annular region of the ASE to free-space couple the light to the detector to image the scene; and
a filter wheel positioned between the ASE and the detector, said filter wheel including at least a first filter segment configured to pass a returned optical transmit signal at the first transmission wavelength and a second filter segment configured to block the returned optical transmit signal and pass passive emissions from at least some of the plurality of other wavelengths,
wherein said detector alternately produces active and passive images of the scene.

21. The optical sensor of claim 20, wherein one of said center and annular regions is configured to be optically transparent at the first transmission wavelength and the other to be optically reflective at the first transmission wavelength.

22. An optical sensor, comprising:
a common Tx/Rx telescope mounted along an optical axis;
an optical source that emits an optical transmit signal at a first transmission wavelength;
a detector responsive to light at a plurality of wavelengths;
a free-space optical path to couple light from the common Tx/Rx telescope to the detector; and
an aperture sharing element (ASE) positioned in a common Tx/Rx aperture in the free-space optical path, said ASE comprising a center region and an annular region;
wherein the optical transmit signal is directed onto the center region of the ASE to free-space couple the optical transmit signal into the free-space optical path to the common Tx/Rx telescope for transmission towards a scene;
wherein light returned from the scene and received by the common Tx/Rx telescope is directed onto the annular region of the ASE to free-space couple the light to the detector to image the scene;
wherein said common Tx/Rx telescope produces an intermediate image at a first field stop from received light, said free-space optical path including focusing optics that relay the intermediate image of the scene to the detector, wherein the ASE is positioned within the focusing optics.

23. The optical sensor of claim 22, wherein the focusing optics include one or more optical elements to re-image the intermediate image from the common Tx/Rx telescope at a second field stop and a plurality of optical elements that relay the intermediate image from the second field stop to the detector, wherein the ASE is positioned within the plurality of optical elements that relay the intermediate image at a position at which any structure or optical imperfections of the ASE are not imaged at the detector.

24. The optical sensor of claim 22, wherein one of said center and annular regions is configured to be optically transparent at the first transmission wavelength and the other to be optically reflective at the first transmission wavelength.

* * * * *

UNITED STATES PATENT AND TRADEMARK OFFICE
CERTIFICATE OF CORRECTION

| | | |
|---|---|---|
| PATENT NO. | : 12,000,676 B2 | Page 1 of 1 |
| APPLICATION NO. | : 17/071729 | |
| DATED | : June 4, 2024 | |
| INVENTOR(S) | : Rogala et al. | |

It is certified that error appears in the above-identified patent and that said Letters Patent is hereby corrected as shown below:

In the Specification

In Column 4, Line 50, delete "53" and insert --52-- therefor

In Column 6, Line 7, delete "102" and insert --100-- therefor

Signed and Sealed this
Fourth Day of February, 2025

Coke Morgan Stewart
*Acting Director of the United States Patent and Trademark Office*